United States Patent [19]

Thuerman

[11] Patent Number: 4,729,754

[45] Date of Patent: Mar. 8, 1988

[54] SEALED BUSHING JOINT FOR CHAIN

[75] Inventor: John H. Thuerman, West Allis, Wis.

[73] Assignee: Rexnord Inc., Brookfield, Wis.

[21] Appl. No.: 918,967

[22] Filed: Oct. 15, 1986

[51] Int. Cl.$^4$ ............................................. F16G 13/06
[52] U.S. Cl. ........................................ 474/207; 474/209
[58] Field of Search ............................... 474/207–210, 474/226, 228, 230

[56] References Cited

U.S. PATENT DOCUMENTS 16,724  7/1897  Bigwood ........................... 474/209
3,365,246  1/1968  Otis et al. ...................... 474/207 X Primary Examiner—Stephen J. Novosad
Assistant Examiner—Thuy M. Bui
Attorney, Agent, or Firm—Richard C. Ruppin

[57] ABSTRACT

A chain link assembly comprises a pair of inner sidebar portions, each defining an aperture and having innermost and outermost surfaces. A hollow bushing is secured to the pair of inner sidebar portions. The bushing includes a central portion which extends between the inner sidebar portions and integral stud portions at each end of the central portion which project into each of the apertures of the inner sidebar portions and terminate at the outermost surfaces of the inner sidebar portions. A pair of seals encircle each of the stud portions, each seal lying between the innermost surface of the inner sidebar portion and the central portion of the bushing.

9 Claims, 4 Drawing Figures

SEALED BUSHING JOINT FOR CHAIN

BACKGROUND OF THE INVENTION

The present invention relates to chains, and in particular to a sealed bushing design used in a chain assembly.

In chains used in ditching machines, earth scraping machines and in similar applications involving operation in abrasive environments, it has been desirable to protect the chain bushings by keeping the bushing and/or pin lubricated and by preventing abrasive material from entering the bushing or pin surfaces. Historically, this has been accomplished by sealing the chain joint or the space between the adjoining plates of interconnected links. There exists in the prior art a plethora of expedients teaching the use of seals between inner and outer sidebars of chain assemblies. Typical of these teachings are the seals disclosed in the current assignee's previous U.S. Pat. Nos. 3,135,128 to Rudolph and 4,464,151 to Kahl which focus on the specific construction of seals used in the chain joint.

Solutions of the problems as set forth by the prior art discussed above have not been readily transferable to related problems confronting those skilled in the art of manufacturing and using chain. In the present situation, it is desirable to fabricate a chain using a stud bushing which would function under heavy loads in hostile environments. For example, a tramming chain used in shuttle cars for underground coal mining is frequently subjected to sulfuric acid in mine water which eats away and corrodes the bushing. Especially destructive in this design is the proclivity of corrosive material or liquid to work down into the crevice between the innermost surface of the inner sidebars and the outside diameter of the bushing where the material or liquid attacks the reduced diameter of the stud bushing. In similar chains, using rollers over the bushings or bushings which are sunk into the inner sidebar portions, the problem is still extant. Further, lubricant applied during assembly or maintenance of the chain tends to escape from between the bushing outside diameter and the inner sidebars.

While the known prior art was busy improving upon the shape and arrangement of seals between the inner and outer sidebars, it did not recognize the problem of fatigue originating at the critically stressed bushing surface interfacing with the innermost surface of the inner sidebars. Some attempts have been made to lessen the chain fatigue by increasing the thickness of the inner sidebar so as to alter the geometry of the chain parts and make the bushing fit better but these have not been totally successful and add to the additional weight and cost of the chain. It was with these constraints in mind that the applicant sought to provide a chain which would stand high loads and operate in environments in which most chain would deteriorate due to attack on the exposed bushing surface on the innermost side of the inner sidebars of the chain.

Accordingly, it is a principal object of the invention to provide a sealed bushing design for a chain assembly which is protective against corrosive materials.

Another object of the invention is the provision of a seal which adds lubricant to a critical bearing surface and retains the lubricant on the bearing surface.

Another object of the invention is to furnish a simple seal strategically placed on the bushing at the inner sidebar of a chain assembly so as to prevent fatigue of the bushing and extend the life of the chain.

A further object of the invention is to provide a seal for a chain link assembly employing a stud bushing for heavy mining and other applications.

SUMMARY OF THE INVENTION

The present invention is directed to a sealed bushing design for chain assemblies which attempts to solve previously known breakage problems in a particular location of the chain.

In a preferred embodiment, the present invention contemplates a chain link assembly including a pair of inner sidebar portions, each of which are formed with an aperture and have innermost and outermost surfaces. The assembly also comprises a hollow bushing having opposite ends which are secured to the inner sidebar portions. A pair of outer sidebar portions each define an opening smaller than the outside diameter of the bushing with one of the outer sidebar portions lying adjacent one end of the bushing and the other of the outer sidebar portions lying adjacent the other end of the bushing. The openings in the outer sidebar portions are substantially aligned with the apertures in the inner sidebar portions. Seals encircle each end of the bushing and lie outside each of the inner sidebar portions between the innermost surface of the inner sidebar portions and the bushing for preventing entry of corrosive material in and leakage of lubricant from between the innermost surface of the inner sidebar portion and the bushing.

The bushing of the preferred embodiment has a central portion and integral stud portions at each end of the central portion. The central portion extends between the innermost surfaces of the inner sidebar portions and the stud portions extend into each of the apertures and terminate at the outermost surface of the inner sidebar portion.

Each of the seals is lubricated and compressable between the inner sidebar and the central portion of the bushing to less than one half the diameter of the seal when uncompressed and removed from the chain assembly. When in place on the chain, the outer diameter of the seal is substantially equal to the outer diameter of the central portion of the bushing.

Various features of novelty which characterize this invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

The invention and its attendant objects and advantages will become better understood by reference to the following detailed description of the preferred embodiment when read in conjunction with the following drawings wherein.

DESCRIPTION OF THE PREFERRED EMBODIMENT

Figure 1:
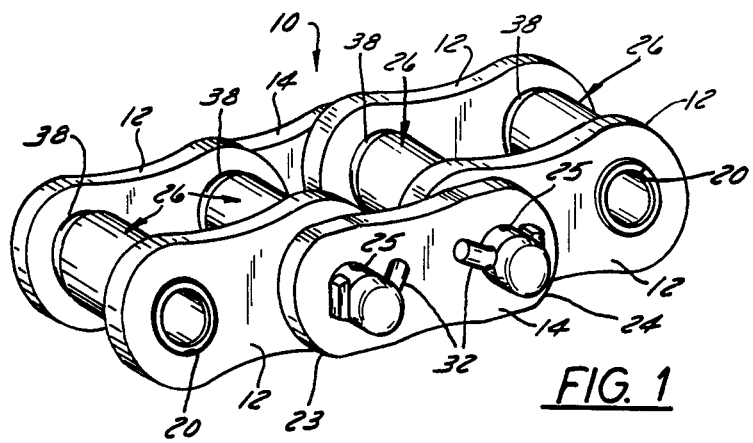
FIG. 1 is a perspective view of the present invention as used in a straight sidebar chain.
Figure 2:
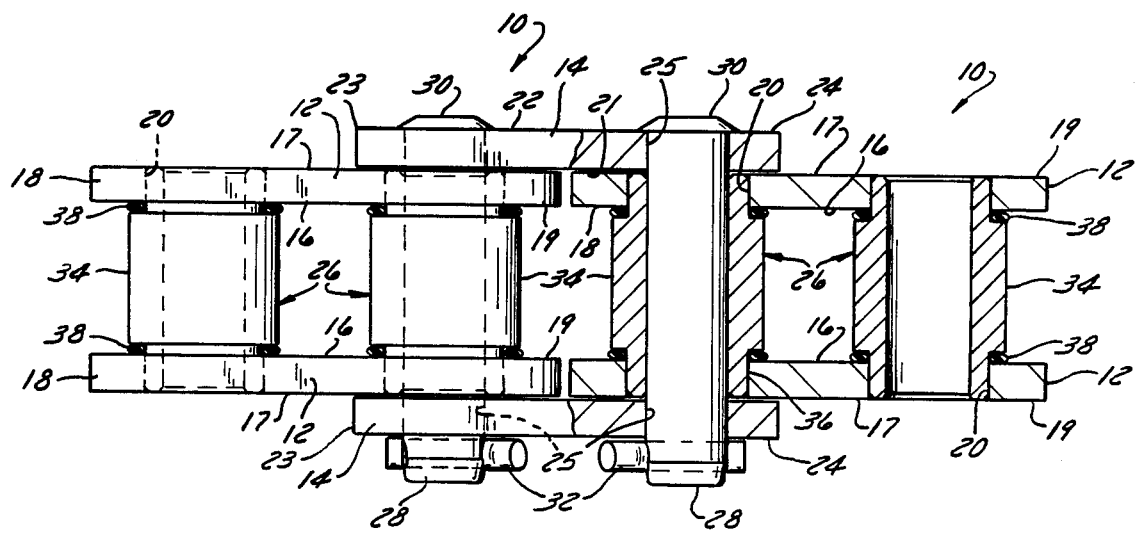
FIG. 2 is a top view partially in cross section of the chain shown in FIG. 1.
Figure 3:
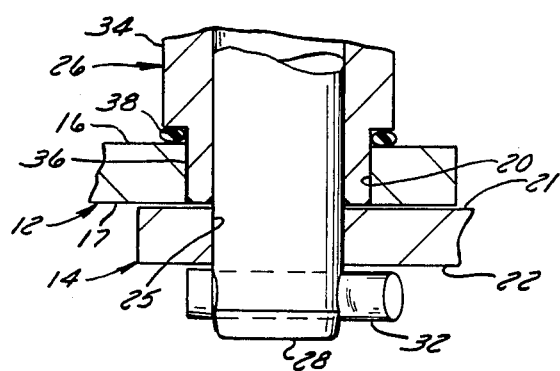
FIG. 3 is an enlarged broken away section of the chain shown in FIG. 2.

FIGS. 1-3 show a straight sidebar chain 10 constructed of a plurality of pairs of inner sidebars 12 and a plurality of outer sidebars 14. Each inner sidebar 12 is an integral piece having an innermost surface 16, an outermost surface 17, and opposite portions 18, 19, each being formed with an aperture 20. Each outer sidebar 14 is likewise an integral piece having an innermost surface 21, an outermost surface 22, and opposite portions 23, 24, each defining an opening 25 in alignment with an aperture 20 of the inner sidebar portion 18, 19. Secured to each inner sidebar 12 are a pair of hollow stud bushings 26. A pin 28 extends through each bushing 26 as well as through opening 25 and aperture 20 to form a chain joint or link assembly. The ends of the pin 28 are constructed in some conventional manner so as to prevent the pin 28 from sliding out of place. In the preferred embodiment, one end of the pin 28 is enlarged with a head 30 overlapping the opening 25 while the other end of the pin 28 is elongated beyond the outer sidebar 14 and apertured to receive a cotter pin 32 or the like. The stud bushing-straight sidebar design illustrated is particularly useful in severe, heavy duty excavating applications, such as a tramming drive chain for underground coal mining equipment such as shuttle cars.

Looking at the chain link assembly in more detail, it can be seen that bushing 26 has an enlarged, cylindrical central portion 34 and integral stud portions 36 at each end of the central portion 34. Central portion 34 extends between and slightly short of the innermost surfaces 16 of the inner sidebar portions 18, 19 while the stud portions 36 extend from the central portion 34 at a point slightly beyond the innermost surface 16 of the inner sidebar portions 18, 19 into the apertures 20 and terminate at the outermost surface 17 of the inner sidebar portions 18, 19. Stud portions 36 are secured to the inner sidebar portions 18, 19 preferably by a press fit between the outside surface of the stud portions 36 and the inside surface of the apertures 20. Use of this stud bushing 26 thus creates a small space between the innermost surfaces 16 of the inner sidebar portions 18, 19 and the outside diameter of the bushing 26 at its central and stud portions.

According to the invention, a pair of compressable seals 38 are used on each bushing 26 to close and protect this space by maintaining lubrication and preventing entry of corrosive material into the space. In particular, each seal 38 is preferably in the form of an O ring which is compressed during link assembly. However, the seal 38 may take on a variety of shapes or forms and may be of any compressable material such as metal or plastic or even an adhesive flowed onto the bushings. Each seal 38 is coated with lubricant, encircles the stud portion 36 and lies against the end of the central portion 34 with a compressable outside diameter substantially equal to the outer diameter of the central portion 34. Each of the seals 38 lie outside the inner sidebar portions 18, 19 between the innermost surface 16 of the sidebar portions 18, 19 and the central portion 34 of the bushing 26.

Figure 4:
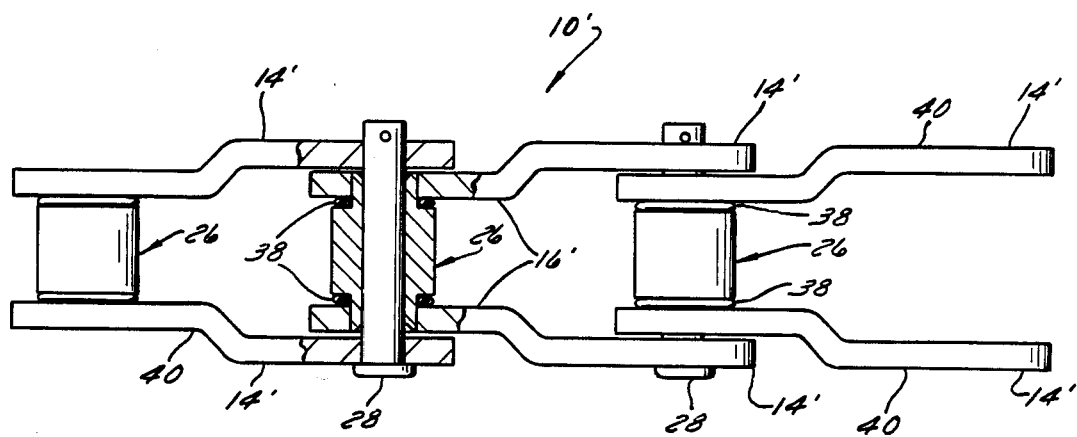
FIG. 4 is a top view of a second embodiment of the present invention using an offset sidebar chain.

FIG. 4 shows an offset sidebar chain 10' made up of a plurality of pairs of offset sidebars 40. Each offset sidebar 40 is an integral piece made up of an inner sidebar portion 12' and an outer sidebar portion 14'. Except for the fact that offset sidebars 40 are used instead of inner and outer sidebars 12, 14, the chain shown in FIG. 4 is identical to chain 10 shown and described earlier.

While the preferred embodiment shows the seals 38 being particularly effective with a stud bushing 26, it should be appreciated that the seals could likewise be applied to a chain assembly employing bushings of any shape sunk into inner sidebars 12 and used with or without rollers. In other words, any time the interface between the bushing 26 and innermost surface 16 of the inner sidebars 12 are subjected to entry of moisture, dirt or corrosive material or exit of lubricant placed on the critical stud portions of the bushing, the seals 38 are utilized to extend the life of the chain.

Unlike prior art seals used in sealing chain joints or the space between adjacent inner and outer sidebars, the present invention recognizes the need to protect critically stressed bushing surfaces lying outside the innermost surface of the inner sidebars.

I claim:

1. An improvement in a chain link assembly which consists of a first pair of spaced parallel sidebars connected at least at one end by a laterally extending hollow bushing, said bushing having an axially extending bore sized and adapted to receive and articulate about a connecting pin which extends through said bushing and is connected at its opposite ends to a more outwardly spaced second pair of sidebars overlapping said first pair of sidebars, said connecting pin and second pair of sidebars comprising part of an articulatable adjacent link assembly, the improvement comprising:

said hollow bushing comprises a cylindrical central body and an integral concentric stud of smaller diameter than said central body and extending from each end of said central body and into secured engagement with one of said first sidebars, said bushing having an annular shoulder at each end of the central body and extending between outer circumference of the stud and the outer circumference of the central body; and a pair of resilient annular seals each of which is interposed betweeen and in simultaneous contact with one shoulder of said bushing and the parallel confronting surface of the adjacent first sidebar, said seals being effective to prevent corrosive material from entering into contact with the bushing study in the space between the sidebar and bushing central body.

2. The improvement in a chain link assembly as recited in claim 1, wherein each stud of said bushing is press-fitted into an opening in the respective sidebar.

3. The improvement in a chain link assembly as recited in claim 1, further wherein each of said resilient seals comprises an O-ring compressed between said bushing shoulder and said sidebar to approximately one-half of its normal thickness in its relaxed state.

4. The improvement in a chain link assembly as recited in claim 1, further including a corrosion preventative lubricant trapped by each of said seals in the area adjacent the bushing stud between the bushing central body and the juxtaposed sidebar.

5. A chain link assembly comprising:

a pair of spaced apart parallel sidebars;

a laterally extending hollow bushing connected to and between corresponding ends of said parallel sidebars, said bushing further comprising a central body, a pair of integral studs each extending from one end of the central body and into fixed engagement with the juxtaposed one of the sidebars and being of smaller cross-section than the central body, and a radially extending shoulder between the outer perimeter of each stud and the outer perimeter of the central body, each of said shoulders being positioned parallel to and in close proximity to the confronting surface of the juxtaposed sidebar; and a pair of resilient seals each interposed between and in contact with one of the bushing shoulders and the confronting sidebar to effectively prevent corrosive material from accessing the bushing studs in the space between the bushing central body and the sidebar.

6. A chain link assembly as recited in claim 5, wherein said bushing central body is cylindrical and said studs are concentric cylinders of smaller diameter than the central body and are press-fit into an opening in a respective one of the sidebars.

7. A chain link assembly as recited in claim 5, wherein each said resilient seal is physically compressed between the bushing shoulder and the confronting surface of the sidebar.

8. A chain link assembly as recited in claim 5, further comprising a corrosion preventive fluid trapped by each of said seal in the region immediately adjacent the respective bushing stud between the corresponding bushing shoulder and sidebar.

9. A chain link assembly as recited in claim 5, wherein each of said seals is a pre-lubricated resilient rubber O-ring compressed of approximately one-half of its normal thickness in a relaxed state.

* * * * *